(12) United States Patent
Fuchtling et al.

(10) Patent No.: US 10,736,265 B2
(45) Date of Patent: Aug. 11, 2020

(54) METHOD FOR OPERATING A CUTTING UNIT BETWEEN FIRST AND SECOND OPERATION MODES

(71) Applicant: CLAAS Selbstfahrende Erntemaschinen GmbH, Harsewinkel (DE)

(72) Inventors: Christian Fuchtling, Dresteinfurt (DE); Andreas Wielenberg, Herford (DE); Udo Beschorn, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 251 days.

(21) Appl. No.: 15/842,316

(22) Filed: Dec. 14, 2017

(65) Prior Publication Data

US 2018/0168101 A1  Jun. 21, 2018

(30) Foreign Application Priority Data

Dec. 15, 2016 (DE) .................. 10 2016 124 552

(51) Int. Cl.
*A01D 41/14* (2006.01)
*A01D 34/28* (2006.01)
(Continued)

(52) U.S. Cl.
CPC ........... *A01D 41/127* (2013.01); *A01D 34/04* (2013.01); *A01D 34/14* (2013.01); *A01D 34/28* (2013.01);
(Continued)

(58) Field of Classification Search
CPC ........ A01B 63/10; A01D 34/04; A01D 34/14; A01D 34/28; A01D 34/283; A01D 34/24–246; A01D 41/127; A01D 41/141; A01D 61/02; A01D 69/03
See application file for complete search history.

(56) References Cited

U.S. PATENT DOCUMENTS 5,359,836 A    11/1994  Zeuner et al.
7,707,811 B1 *  5/2010  Strosser ............... A01D 41/141
                                             56/10.2 E
(Continued)

FOREIGN PATENT DOCUMENTS

EP    2832206 A1    2/2015
EP    3087819 A2    11/2016

OTHER PUBLICATIONS

European Search Report for European No. EP17186410 dated Mar. 29, 2018 (7 pages).

*Primary Examiner* — Robert E Pezzuto
*Assistant Examiner* — Adam J Behrens
(74) *Attorney, Agent, or Firm* — Lempia Summerfield Katz LLC

(57) ABSTRACT

The present invention relates to a method for operating a cutting unit (1) that has a cutter bar (6) that is operated rigidly or flexibly, depending on the harvest conditions, which can be operated in at least two different operating modes, wherein the cutting unit (1) includes a first sensor assembly (1) disposed on the cutting unit (1) that can be deactivated, which is for operating the cutting unit (1) in a first operating mode, and a second sensor assembly (17) for operating the cutting unit (1) in a second operating mode, wherein, when switching between the at least two operating states, the first sensor assembly (13) or the second sensor assembly (17) is activated without interruption in operation, to execute a distance determination, depending on the selected operating mode.

15 Claims, 3 Drawing Sheets

(51) Int. Cl.
- *A01D 41/127* (2006.01)
- *A01D 34/04* (2006.01)
- *A01D 34/14* (2006.01)
- *A01B 63/10* (2006.01)
- *A01D 61/02* (2006.01)
- *A01D 69/03* (2006.01)

(52) U.S. Cl.
CPC ......... *A01D 34/283* (2013.01); *A01D 41/141* (2013.01); *A01B 63/10* (2013.01); *A01D 61/02* (2013.01); *A01D 69/03* (2013.01)

(56) References Cited

U.S. PATENT DOCUMENTS

| | | | |
|---|---|---|---|
| 7,975,458 B1 * | 7/2011 | Noll | A01D 45/22 56/10.2 E |
| 8,201,388 B1 * | 6/2012 | Vandeven | A01D 41/141 56/10.2 E |
| 8,857,141 B2 * | 10/2014 | Honas | A01D 41/14 56/181 |
| 9,402,343 B1 * | 8/2016 | Allochis | A01D 34/283 |
| 10,349,578 B2 * | 7/2019 | Cook | A01D 41/141 |
| 2008/0078155 A1 * | 4/2008 | Coers | A01D 41/141 56/15.8 |
| 2016/0007531 A1 * | 1/2016 | Schlipf | A01D 41/141 56/10.2 E |
| 2016/0316624 A1 * | 11/2016 | Ritter | A01D 41/141 |
| 2017/0311541 A1 * | 11/2017 | Pankaj | A01D 34/006 |
| 2018/0103580 A1 * | 4/2018 | Neely | A01D 34/04 |

\* cited by examiner

METHOD FOR OPERATING A CUTTING UNIT BETWEEN FIRST AND SECOND OPERATION MODES

CROSS REFERENCE TO RELATED APPLICATIONS

This application claims priority to German Patent Application No. DE 10 2016 124 552.6, filed Dec. 15, 2016, the entire disclosure of which is hereby incorporated herein by reference.

FIELD OF THE INVENTION

The present invention relates to a method for operating a cutting unit having a cutter rigidly or flexibly operated cutter bar, and to a cutting unit and combine harvester having such a cutter bar.

BACKGROUND

It is known from the prior art to operate cutting units equipped with conveyor belts for harvest transport, so called drapers, having a rigid or flexible cutter bar, in at least two operating modes, depending on the harvest conditions. For harvesting grain, the cutting unit is guided over the ground with rigid cutter bars at a preset cutting height, i.e. a predefined height setting. Changes in the distance between the ground and the cutter bar of the cutting unit are reacted to, such that the cutting unit is continuously adjusted in terms of its distance to the ground. For this, the cutting unit has a first sensor assembly, which can be deactivated, that is disposed on the cutting unit, for operating the cutting unit in this first operating mode. The first sensor assembly is formed by numerous sensor arms or bands disposed on the undersurface of the cutting unit, which are disposed directly behind the cutter bar.

A second operating mode is the flexible operation of the cutter bar, which lies on the ground in order to follow the contour of the ground, while the cutting unit frame of the cutting unit is guided at a predefined distance from the ground. For this, the cutting unit comprises a second sensor assembly for operating the cutting unit in the second operating mode.

Switching between these two operating modes requires the deactivation of the first sensor assembly, e.g. by removing the sensor bands or through the manual transferring of the sensor bands into a parking position, and the subsequent calibration of a control device by means of which an actuating element is activated, which maintains a constant spacing between the cutting unit, or cutting unit frame, and the ground. Switching from the first operating mode to the second operating mode and back is time consuming due to the manual deactivation, or activation, respectively, in each case accompanied by an interruption in the operation thereof, and the calibration process that is to be carried out.

SUMMARY

The disclosed embodiments provide a method for operating a cutting unit, and to provide a cutting unit, in order to be able to react more flexibly to changing harvest conditions.

In one embodiment, it is proposed that when switching between the at least two operating modes, depending on the selected operating mode, the first sensor assembly or the second sensor assembly is activated without interrupting the operation thereof in order to determine the spacing. The method provides for the simultaneous operation of both sensor assemblies, wherein, in accordance with the selected operating mode, only the sensor signals supplied by the first sensor assembly or the second sensor assembly are processed in order to adjust the height of the cutting unit. As a result, it is not necessary to manually deactivate the first sensor assembly disposed on the cutting unit through the removal or the transferring thereof to a parking position, in order to switch from the first to the second operating mode, as is necessary according to the prior art, requiring an interruption in the operation thereof. The same applies when switching from the second to the first operating mode, which is likewise carried out without interruption of the operation, while according to the prior art, this requires that the sensor bands be reinstalled, or returned from the parking position.

The first sensor assembly can be configured as a mechanical ground sensing device, comprising, e.g., sensor bands, sensor skids, or the like. Alternatively, the first sensor assembly can also be configured as a device that functions without physical contact, which detects the distance to the ground. The second sensor assembly can be configured as a device integrated in the cutting unit, in particular the cutting unit frame, which detects the distance to the ground directly or indirectly. The method makes it possible to switch between the at least two operating modes during the harvesting process, in order to be able to quickly and flexibly react to changes in the harvest conditions, without interrupting the harvesting process. The manual deactivation of the first sensor assembly, as well as the recalibration of the first or second sensor assembly after a manual activation of the first sensor assembly, is eliminated when changing operating modes. The method can be used for belt cutting units as well as for grain cutting units with flexible cutter bars.

It is advantageous that the calibration is carried out for the first sensor assembly and the second sensor assembly independently of the selected operating mode. The calibration of the first sensor assembly and the second sensor assembly can be carried out sequentially thereby. For this, the calibration can be initiated after installation on a harvester, in particular on a combine harvester, in order to calibrate the first sensor assembly and the second sensor assembly. The presence of the first sensor assembly on the cutting unit can be checked in an upstream step thereby. Furthermore, in a preceding step, the cutter bar can be automatically hydraulically released. For the calibration, the upper and lower limits of position sensors of the first and further sensor assemblies can be determined. The data obtained through the calibration are stored in a control device, such that they are available at all times when switching between the operating modes.

Alternatively, the calibrations of the first sensor assembly and the second sensor assembly can be carried out independently. This means that the calibration is first carried out for only the second sensor assembly, because, e.g., an at least partially releasable first sensor assembly is not disposed on the cutting unit when the calibration is initiated. Accordingly, after the first sensor assembly is attached, the calibration thereof can be carried out separately. As explained above, the data obtained for the first sensor assembly and the second sensor assembly by means of the calibration process are stored in a control device, such that they are available at all times when switching between the operating modes.

In particular, the first sensor assembly can be activated in the first operating mode, in which the cutting unit is operated with a rigid cutter bar, by means of which a predefined height adjustment of the cutting unit is controlled or regulated. In order to rigidly operate the cutter bar, it can by hydraulically tensioned by means of an actuator element.

Furthermore, the second sensor assembly can be activated in the second operating mode, in which the cutting unit is operated with a flexible cutter bar, by means of which a predetermined height adjustment of the cutting unit frame of the cutting unit can be controlled or regulated. For a flexible operation of the cutter bar, this can be hydraulically released through an appropriate activation of the actuator element.

Thus, during the harvesting process in the first operating mode, in which the cutter bar is operated rigidly, in order to harvest upright grain, it may be the case that there are deposits between the upright grain, which require a cut directly above the ground, i.e. below the preset cutting height. For this, it is possible to switch from the first operating mode to the second operating mode, in which the cutter bar is operated in a flexible manner, in order to lay the cutter bar on the ground while the cutting unit frame is guided at a predefined/predefinable distance to the ground. In this situation, the first sensor assembly is deactivated, i.e. the signals generated by the first sensor assembly are not processed for regulating the distance to the ground. Instead, when switching to the second operating mode, the second sensor assembly, which has been inactive until then, is activated, in order to process signals generated by the second sensor assembly, which are used to regulate the spacing, or control the height, respectively, of the cutting unit. The two sensor assemblies can function in an overlapping manner, such that a quick switch between operating modes, and a combining thereof, are possible. In order to improve the process flow, it is also possible to incorporate a load relief system for the flexible cutter bar in the control or regulating process.

Preferably, with an operation of the cutting unit above the predefined height setting of the cutter bar, it is possible to switch automatically to a rigid state, independently of the selected operating mode. This is useful, for example, upon reaching a headland, because the cutting unit is raised at this point. This ensures an optimal, or minimal spacing between the reel and the cutting unit table, and allows the reel to support the crop flow in an optimal manner.

Furthermore, in an operation of the cutting unit with a flexibly operated cutter bar above the predefined height setting, the first sensor assembly is activated in a time-dependent manner. This is advantageous when, at the end of a headland the cutting unit is placed back in the field that is to be harvested, because the first sensor assembly already comes in contact with the ground, before the second sensor assembly can generate a signal.

In particular, the cutter bar can be switched automatically to a flexible state when the cutting unit is operated below a threshold value of the predefined height setting, independently of the selected operating mode.

Moreover, when the cutting unit is operated with a flexibly operated cutter bar below a threshold value of the predefined height setting, the second sensor assembly can be operated in a time-dependent manner. This function likewise supports the placement of the attachment back into the crop, because the cutter bar is first released just above the ground. As a result, crop lifters disposed on the cutting unit, for example, are placed at the correct angle to the ground, instead of at a steep angle, which is obtained with the abrupt release of the cutter bar and exposes them to the risk of damage when they are placed back into the crop.

In another aspect, a cutting unit that has a cutter bar, which can be operated rigidly or flexibly by means of an actuator element, depending on the harvest conditions, wherein the cutting unit can be operated in at least two different operating modes, and the cutting unit includes a first sensor assembly disposed on the cutting unit, that can be deactivated, which is for operating the cutting unit in a first operating mode, and a second sensor assembly for operating the cutting unit in a second operating mode. The cutting unit is connected to a control device, which is configured to activate the first sensor assembly or the second sensor assembly, without interruption of the operation, when switching between the at least two operating modes, depending on the selected operating mode, in order to determine a distance to the ground. The cutting unit can preferably include the control device. This has the advantage that when the cutting unit is used differently with other harvesters, the method according to the invention can be implemented independently of an additional control unit of the harvester. Irrespective of this, the control device can also be a component of the harvester with which the cutting unit is operated. The cutter bar is disposed on supporting arms, which are pivotally hinged to the main frame of the cutting unit. By means of the actuator element, which comprises a hydraulic cylinder dedicated to the respective support arm, the cutter bar can be operated in a rigid or flexible manner through an appropriate change in the pressure applied by this actuator element. The calibration data from the first sensor assembly and the second sensor assembly necessary for switching operating modes without interruption are preferably stored in the control device.

The first sensor assembly can include at least two devices that sense the ground, which are disposed on the side of the cutting unit facing toward the ground. Such ground sensing devices, which are releasably attached to the cutting unit, can be sensor bands, sensor skids, or other means that mechanically sense changes in the ground contour. Alternatively, the ground sensing device can also be configured as a device that functions without physical contact.

In particular, the second sensor assembly can be configured for detecting a pivotal movement, caused by the support arms supporting the cutter bar. For this, the second sensor assembly can be integrated in the cutting unit.

Moreover, the control device can be configured to activate the actuator element, by means of which the cutter bar can be operated in a rigid or flexible manner. This enables a quick switching between the operating modes.

Furthermore, a combine harvester may have a cutting unit according to any of the preceding embodiments, which can be operated, in particular, by a method according to any of the preceding embodiments. A combine harvester that has such a cutting unit allows for a simple switching between the at least two operating modes, without requiring a manual deactivation of the first sensor assembly prior to switching operating modes. The calibration effort is also eliminated in a respective switching between the operating modes.

BRIEF DESCRIPTION OF THE DRAWINGS

The present invention shall be described in greater detail below, based on exemplary embodiments depicted in the drawings.

Therein.

DETAILED DESCRIPTION

Figure 1:
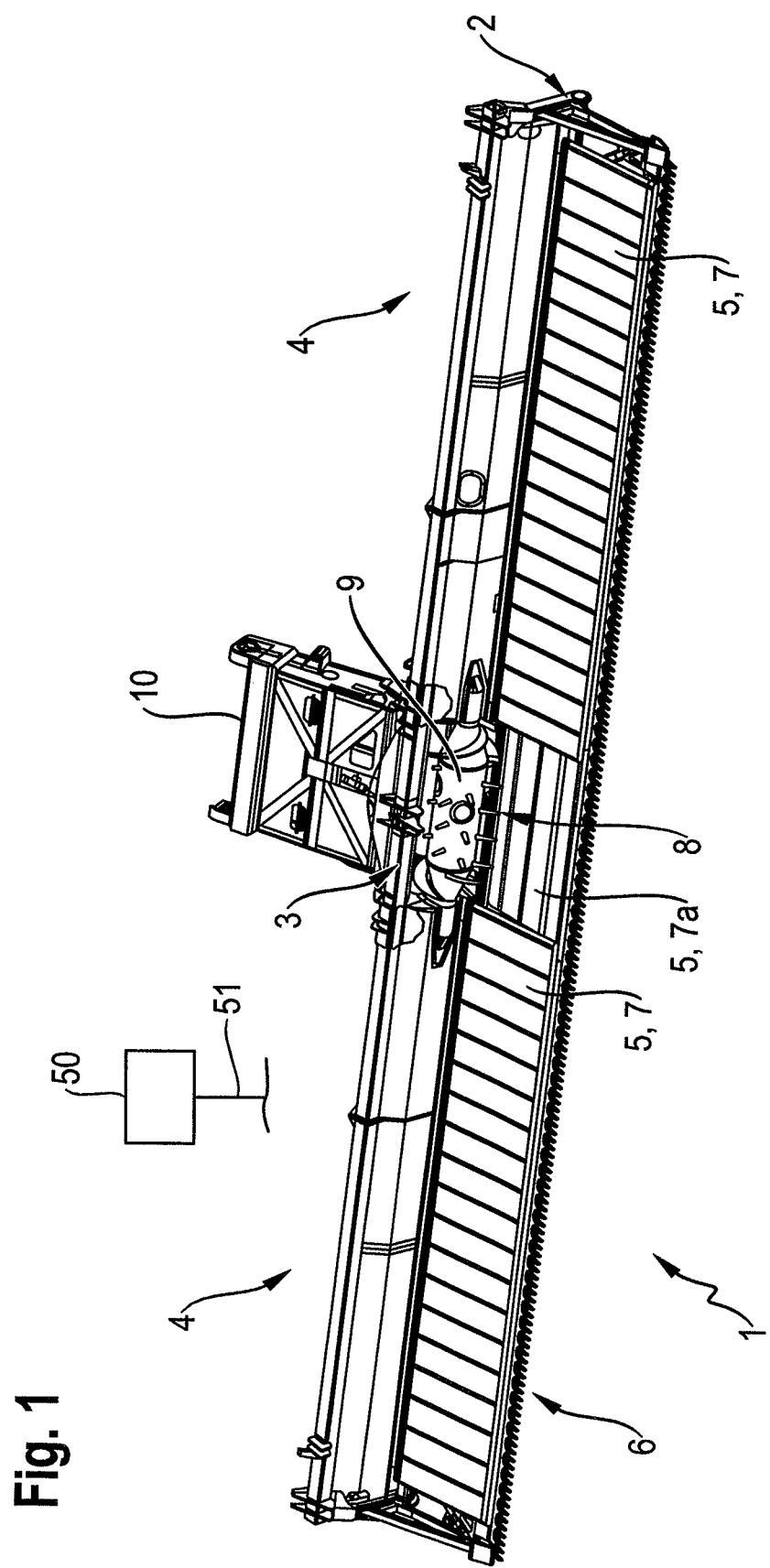
FIG. 1 shows a schematic view of a cutting unit.

The illustration in FIG. 1 shows a schematic depiction of a cutting unit 1. The cutting unit 1 has a main frame 2, on which a middle section 3 and at least two side sections 4, disposed adjacent to the middle section 3, are disposed. A cutter bar 6 is disposed on the middle section 3 and the side sections 4 on the front surface of the cutting unit 1 lying opposite the main frame 2, which extends substantially over the entire width of the cutting unit 1. Reels (not shown) are disposed on the main frame 2 of the cutting unit 1, which extend over the width of the side sections 4 as well as in part over the width of the middle section 3. The reels serve to improve the receiving of the harvest by the cutter bar 6.

The harvest separated by the cutter bar 6 is fed to a conveyor 5 disposed behind the cutter bar 6, which is formed on the respective side sections 4 as at least one continuous, revolving belt 7, which revolves parallel to the longitudinal axis of the cutting unit 1. The continuous revolving belts 7 are disposed adjacent to the middle section 3, in order to transport the harvest cut by the cutter bar 6 parallel to the longitudinal axis of the cutting unit 1, toward the middle section 3, and to feed the harvest into a feed device. The middle section 3 likewise comprises a conveyor 5 configured as a continuous revolving conveyor belt 7a. Other designs for the conveyor 5 in the middle section 3 are also conceivable. The feed device 8 is configured as a feed roller 9 that can be driven. The feed device 8 conducts the harvest supplied from the side by the continuous belts 7 to the middle section 3 into an opening provided behind the feed roller 9 in the main frame 2, through which the harvest is supplied to the combine harvester for further processing through a feed channel 10, to which the cutting unit 1 is releasably attached, which is located on a, not shown, combine harvester.

Figure 2:
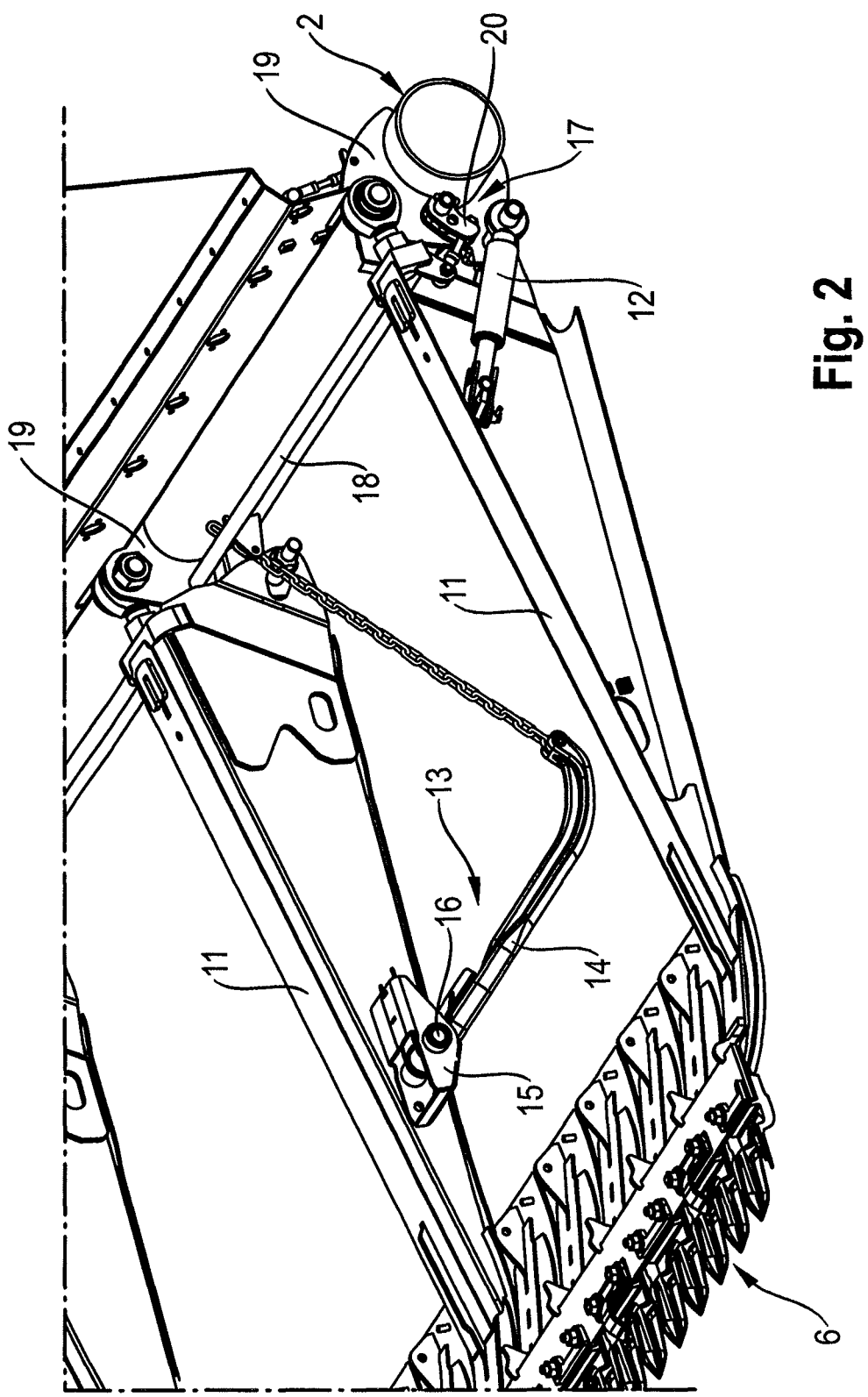
FIG. 2 shows a partial view of the cutting unit according to FIG. 1.

The illustration in FIG. 2 shows a partial view of the cutting unit according to FIG. 1. Support arms 11 are hinged to the main frame 2 such that they can pivot over a horizontal axis. The cutter bar 6 is disposed on the support arms 11. An actuator element configured as a hydraulic cylinder 12 is dedicated to each support arm 11, with which the respective support arm 11, and together therewith, the cutter bar 6, can be operated in at least one first operating mode and one second operating mode. In the first operating mode, the cutter bar is operated rigidly. For this, the hydraulic cylinders 12 are subjected to a hydraulic pressure greater than a first threshold value, such that the individual support arms 11, and together therewith, the cutter bar 6, are unable to pivot vertically. The cutting unit 1 is guided to a predefined distance from the ground. In order to control or regulate the distance with respect to the cutting height, the distance between the cutting unit 1 and the ground is detected by a first sensor assembly 13.

In the second operating mode, the cutter bar 6 is operated flexibly. For this, the hydraulic cylinders 12 are subjected to a hydraulic pressure below a second threshold value, such that the cutter bar 6 lies on the ground with a weight that is a function of the pressure. With a change in the ground contour followed at least in part by the cutter bar 6, the support arms 11 are deflected vertically. The vertical deflection is determined by means of a second sensor assembly 17.

A third operating mode provides for the flexible operation of the cutter bar 6 and the conveyors 5 of the side sections 4 disposed downstream of the cutter bar. In this third operating mode, the cutter bars 6 and the continuous revolving belts 7 follow the changes in the ground contour, which are detected by the second sensor assembly 17.

The first sensor assembly 13 is configured as a ground sensing device. This comprises sensor bands 14, sensor skids, or the like, each of which are disposed at one end, at a bearing point 15, on at least two support arms 11 of the cutting unit 1, such that they can pivot over a horizontal pivotal axis 16. Each side section 4 preferably has at least two sensor bands 14, which are spaced apart from one another. With a change in the ground contour, which results in a change in the distance thereto, the deflection of the respective sensor band 14 over a pivotal axis 16 is detected by means of a potentiometer dedicated thereto. The signal supplied by the potentiometer is evaluated by a control device 50 dedicated to the cutting unit 1, in order to carry out a correction corresponding to the change in distance, so that the predefined height setting, or cutting height, can be maintained. The control device 50 is connected to the sensor assemblies 13 and 17 by means of a signal line 51. The sensor bands 14 are releasably disposed to the support arms 11, such that they can be replaced if necessary.

The second sensor assembly 17 is configured to detect the pivotal movement caused by the support arm 11 of the cutting unit 1 supporting the cutter bar 6, when the cutting unit 1 is operated in the second operating mode. The second sensor assembly 17 comprises a shaft 18, which extends substantially over the entire width of the respective side section 4. The shaft 18 is rotatably supported in consoles 19 dedicated to the support arms 11. Furthermore, a lever assembly 20 is provided, through which the shaft 18 is connected to the respective support arms 11. The vertical deflection of the support arms 11 when there is a change in position is transferred by the lever assembly 20 to the shaft 18 as a rotational movement. The greatest vertical deflection of a support arm 11 at a side section 4 results in the greatest rotation of the shaft 18, which is drawn on as a signal that is to be assessed for an automatic height adjustment of the cutting unit 1. For this, the cutting unit 1, which is disposed on the feed channel 10 of the combine harvester, is adjusted in terms of its height by corresponding hydraulic cylinders disposed on the feed channel 10 and the combine harvester, such that the distance of the main frame 2 to the ground is nearly identical at all side sections 4.

The cutting unit 1 is to be operated such that when switching between the at least two operating modes, the first sensor assembly 13 or the second sensor assembly 17 is activated without interruption in the operation, depending on the selected operating mode, in order to execute a distance determination. For this, the first sensor assembly 13 and the second sensor assembly 17 must be calibrated prior to starting the harvest process. The data obtained through the calibration are stored in the control device 50 such that they can be accessed.

Figure 3:
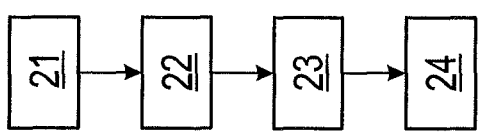
FIG. 3 shows a flow chart illustrating a calibration process.

A flow chart illustrating a calibration process or learning process is depicted in FIG. 3, in which the first and second sensor assemblies 13, 17 are calibrated in the calibration process. The calibration process takes place thereby, independently of the selected operating mode. For this, it is checked in step 21 whether the first sensor assembly 13 is disposed on the cutting unit 1. Independently of the presence of the first sensor assembly 13, in step 22 the actuator element configured as a hydraulic cylinder 12 is automatically activated by the control device 50, in order to release the cutter bar 6. In the following steps 23 and 24, both the upper and lower threshold values for the second sensor assembly 17, for the deflection of the cutter bar 6, as well as the upper and lower threshold values for the first sensor assembly 13, for the deflection of the sensor bands 14, are learned, as long as these sensor assemblies have been attached to the cutting unit 1. For this, the determined calibration data are stored in the control device 50 such that they can be accessed. When the calibration data for the two sensor assemblies 13 and 17 are obtained, a switching of operating modes can be carried out at any time, without having to recalibrate.

In the following, it shall be described by way of example how an operating mode switch can be carried out while the cutting unit 1 is in a harvesting mode, after a one-time calibration has been carried out. It shall be assumed that the initial operating mode is the first operating mode, which embodies the operation of the cutting unit 1 with a rigidly operated cutter bar 6, which is used for harvesting stalk-type crops, such as grain. An operator determines a cutting height in the framework of this operating mode. The cutting height is maintained based on the changes in distance to the ground determined by means of the first sensor assembly 13.

The second sensor assembly 17 is deactivated, i.e. the control device does not process signals recorded by the second sensor assembly 17.

When the harvester reaches a crop deposit, i.e. stalk-type harvest lying on the ground, the preset cutting height of the first operating mode does not enable harvesting of this partial crop deposit. The uninterrupted switching from the first operating mode to the second operating mode enables a change in the operating behavior of the cutting unit 1, such that the cutter bar 6 is then operated in a flexible manner.

In a first method step, the sensor bands 14 are regulated to a minimum target value. Subsequently, the cutter bars 6 are released through a corresponding activation of the actuator element 6, i.e. the hydraulic cylinder 12. Upon overcoming the second threshold value for the pressure to which the hydraulic cylinders 12 on the support arms 11 are subjected, the first sensor assembly 13 is deactivated by the control device 50, i.e. signals recorded by the first sensor assembly 13 are no longer processed by the control device 50. Instead, the second sensor assembly 17 is activated, i.e. signals provided by this sensor assembly 17 representing a change in distance through the deflection of the cutter bar 6, are processed by the control device 50 for adjusting the height. A switching from the first operating mode to the second operating mode is also useful, when, due to the condition of the ground, or the ground contour, harvesting with a rigidly operated cutter bar 6 over the entire working width of the cutting unit 1 is not possible.

Upon leaving the region of the crop deposit, the operator switches operating modes again. In that the target value for the sensor bands 14 returns again to the originally set cutting height, the uninterrupted transition from the use of the second sensor assembly 17 back to the first sensor assembly is initiated. At the same time, the cutter bar 6 is again tensioned through an activation of the actuator element, i.e. through pressure applied by the hydraulic cylinder 12, such that it can be operated rigidly.

Another aspect of the method according to the invention is that with an operation in the second operating mode, or third operating mode, when a height position of the cutting unit 1 above the working position is reached, as is the case, for example, at headlands, or through a manual raising of the cutting unit 1, the control unit 50 automatically activates the actuator element such that the cutter bar 6 is operated rigidly. This ensures an optimal, or minimal, spacing between the reel and the cutting unit table, and allows the reel to optimally support the harvest flow. This function also supports the replacement of the attachment in the crop, because the cutter bar 6 is first released just above the ground through the appropriate activation of the actuator element by the control device 50, i.e. it is again operated flexibly, which is detected by means of the first sensor assembly 13. As a result, the crop lifters are placed on the ground at the correct angle, instead of at a steep angle, which would be obtained if the cutter bar 6 were released immediately, which would expose the crop lifters to the risk of damage when being placed back in the crop.

Figure 4:
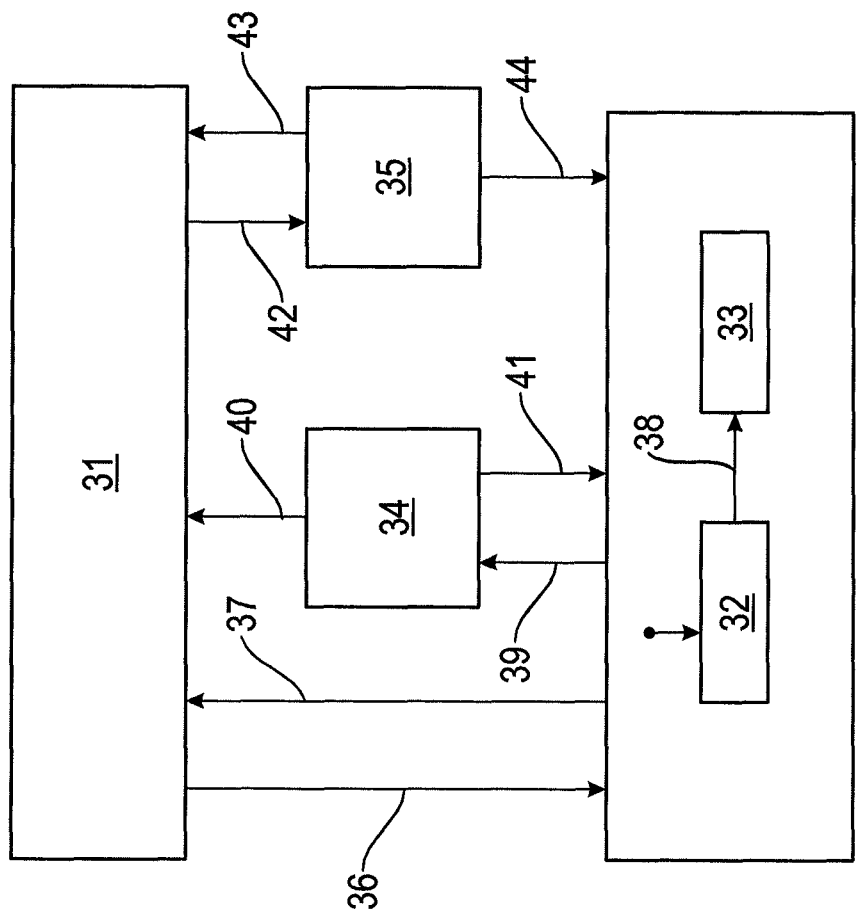
FIG. 4 shows a flow chart illustrating operating states and transitions between the operating states.

A flow chart illustrating possible operating states and transitions between them is depicted in FIG. 4. The numeral 31 indicates an initial state of the cutting unit 1, in which the cutter bar 6 is operated rigidly. The cutting unit 1 is operated in the first operating mode. The maintaining of the cutting height, or the distance of the cutting unit 1 to the ground, is monitored by means of the sensor bands 14 of the first sensor assembly 13.

The numeral 32 indicates a state of the cutting unit 1 in which the cutting unit 1 is switched to the second operating mode, in which the cutter bar 6 is operated flexibly. For this, the actuator element is activated by the control unit 50 such that the hydraulic cylinder 12 is subjected to a hydraulic pressure that is lower than the second threshold value. In this state 32, the maintaining of the cutting height is controlled or regulated based on the changes in the distance to the ground determined by means of the first sensor assembly 13.

The numeral 36 indicates a transition step from the first state 31 to the second state 32, which is initiated as a function of the target value for the cutting height regulation that has been set. As has already been explained above, the setting of a minimum target value for the sensor bands 14 results in the initiation of the transition from the first operating mode to the second operating mode.

The numeral 37 indicates a transition step from state 32 to state 31, which is initiated as a function of the target value that has been set for the cutting height regulation, or alternatively, by the raising of the cutting unit 1 above the working position. The transition step 37 from the second operating mode to the first operating mode thus takes place through the change in the target value of the cutting height regulation from a minimum target value to the target value set for the first operating mode, for the cutting height or the manual removal of the cutting unit 1.

The numeral 33 indicates the state of the cutting unit 1 in which the cutter bar 6 is operated in accordance with the second operating mode, wherein the height control is carried out by means of the second sensor assembly 17. In the transition step 38, the actual value of the hydraulic pressure the hydraulic cylinders 12 of the support arms 11 are subjected to is monitored by the control device 50 for this. Upon exceeding the second threshold value for the pressure the hydraulic cylinders 12 are subjected to, the first sensor assembly 13 is deactivated by the control device 50, and the second sensor assembly 17 is activated.

The numeral 34 indicates the state of the cutting unit 1 in which the cutting unit 1 is operated in another operating mode. In this other operating mode, the cutting unit 1 is raised manually by an operator. This operating mode may be employed upon reaching a headland.

The numeral 39 indicates a transition step from state 33 to state 34, which is initiated with the raising of the cutting unit 1. According to this transition step 39, the exceeding of a threshold value for the actual value of the cutting height is monitored by the control device 50. When the threshold value for the cutting height is exceeded, another, time-dependent threshold value is monitored by the control device 50. The control device monitors how long the threshold value for the cutting height is exceeded.

If this time-dependent threshold value is likewise exceeded, a transition step 40 is introduced by the control device 50. The cutting unit 1 is switched to the first operating mode in accordance with state 31. For this, the actuator element is activated accordingly by the control device 50, in order to operate the cutter bar 6 rigidly. Moreover, the automatic deactivation of the second sensor assembly 17 and activation of the first sensor assembly 13 by the control device 50 take place. The transition step 40 is controlled in a position-dependent and time-dependent manner.

The numeral 41 indicates a transition step from the state 34 to the state 33, which is initiated after raising the cutting unit 1 when the raising of the cutting unit 1 does not take longer than the period defined by the time-dependent threshold value. There is no change in operating modes during the transition step 41.

The numeral 35 indicates the state of the cutting unit 1 in which the cutting unit 1 is operated in another operating mode. In this other operating mode, the cutting unit 1 is manually lowered by an operator. This operating mode may be employed after driving through a headland, before the cutting unit 1 is placed back in the crop that is to be harvested.

The numeral 42 indicates a transition step from state 31 to state 35, which is initiated with the manual lowering of the cutting unit 1. According to this transition step 42, the control device 50 monitors the exceeding of a threshold value for the actual value of the cutting height while the cutting unit 1 is lowered manually.

When state 35 is reached, another time-dependent threshold value is monitored by the control device 50. The control device 50 monitors how long the cutting unit remains below the threshold value for the cutting height. If the value likewise falls below this time-dependent threshold value, a transition step 44 is introduced by the control device 50. The cutting unit 1 is switched from the first operating mode according to state 31 to the second operating mode according to state 33. For this, the actuator element is activated accordingly by the control device 50, in order to operate the cutter bar flexibly. Moreover, the automatic deactivation of the first sensor assembly 13 and activation of the second sensor assembly 17 by the control device 50 takes place. The transition step 44 is likewise controlled in a position- and time-dependent manner.

The numeral 43 indicates a transition step from state 35 back to state 31, which is initiated after lowering the cutting unit 1 when the lowering of the cutting unit 1 does not take longer than the period defined by the time-dependent threshold value. The operating mode is not changed during the transition step 43.

Fundamentally, this method can also be used when the raising and lowering of the cutting unit 1 is carried out automatically. The entering and exiting a headland, for example, can be determined by means of a position location system, such that the switching between the operating modes can take place automatically.

List of Reference Symbols

| | |
|---|---|
| 1 | cutting unit |
| 2 | main frame |
| 3 | middle section |
| 4 | side section |
| 5 | conveyor |
| 6 | cutter bar |
| 7 | belt |
| 7a | conveyor belt |
| 8 | feed device |
| 9 | feed roller |
| 10 | feed channel |
| 11 | support arm |
| 12 | hydraulic cylinder |

-continued

List of Reference Symbols

| | |
|---|---|
| 13 | first sensor assembly |
| 14 | sensor band |
| 15 | bearing point |
| 16 | pivot axis |
| 17 | second sensor assembly |
| 18 | shaft |
| 19 | console |
| 20 | lever assembly |
| 21 | step |
| 22 | step |
| 23 | step |
| 24 | step |
| 31 | state |
| 32 | state |
| 33 | state |
| 34 | state |
| 35 | state |
| 36 | transition step |
| 37 | transition step |
| 38 | transition step |
| 39 | transition step |
| 40 | transition step |
| 41 | transition step |
| 42 | transition step |
| 43 | transition step |
| 44 | transition step |

The invention claimed is:

1. A method for operating a cutting unit with a rigidly or flexibly operated cutter bar, depending on harvest conditions, comprising:
   operating the cutting unit in at least one of a first operating mode or a second operating mode,
      wherein the first operating mode uses a first sensor assembly for operating a cutter bar of the cutting unit rigidly to be at a predefined height setting over a ground,
      wherein the second operating mode uses a second sensor assembly for operating the cutter bar of the cutting unit flexibly so that the cutter bar is guided to follow a contour of the ground while a cutting frame of the cutting unit is guided at a predetermined distance from the ground;
   determining at least one aspect of operation, the at least one aspect of operation comprising a height position of at least a part of the cutting unit or a location of the cutting unit based on a position location system; and
   automatically switching, based on the at least one aspect of operation comprising the height position of the at least a part of the cutting unit or the location of the cutting unit, between one of the first operating mode and the second operating mode and another of the first operating mode or the second operating mode, wherein depending on the selected operating mode, output from the first sensor assembly or the second sensor assembly is used for control of the cutter bar without interruption of the operation of the cutting unit.

2. The method according to claim 1, further comprising calibrating the first sensor assembly and the second sensor assembly independently of the selected operating mode.

3. The method according to claim 1, further comprising calibrating the first sensor assembly and the second sensor assembly independently of one another.

4. The method according to claim 1, wherein, responsive to determining that the cutting unit is operating above the predefined height setting, automatically switching to operating the cutting unit with the rigid cutter bar independently of the selected operating mode.

5. The method according to claim 4, wherein responsive to determining that the cutting unit is operated with the flexible cutter bar above the predefined height setting for greater than a time-dependent threshold, automatically switching to the first operating mode for operating the cutting unit with the rigid cutter bar.

6. The method according to claim 1, wherein, responsive to determining that the cutting unit is operating below a threshold value for the predefined height setting of the cutter bar, automatically switching to operating the cutting unit with the flexible cutter bar, independently of the selected operating mode.

7. The method according to claim 6, wherein responsive to determining that the cutting unit is flexibly operating with the cutter bar below a threshold value for the predefined height setting for greater than a time-dependent threshold, automatically switching to the second operating mode and using the second sensor assembly for controlling the cutting unit.

8. A combine harvester that can be operated, in accordance with the method of claim 1.

9. The method according to claim 1, wherein the first sensor assembly comprises a mechanical ground sensing device.

10. The method according to claim 1, wherein the second sensor assembly detects a distance to the ground.

11. The method according to claim 1, wherein the cutting unit comprises a grain cutting unit.

12. The method according to claim 2, wherein the calibration of the first sensor assembly and the second sensor assembly is performed sequentially.

13. The method according to claim 1, wherein the at least one aspect of operation comprises a height position of at least a part of the cutting unit.

14. The method according to claim 13, wherein, responsive to manually raising the cutting unit, automatically switching to the first operating mode so that the cutting unit operates with the rigid cutter bar.

15. The method according to claim 1, wherein determining the at least one aspect of operation comprises determining a location of the cutting unit based on a position location system; and wherein automatically switching is based on the location of the cutting unit.

* * * * *